Oct. 5, 1948. A. H. CROZIER 2,450,583
SEED POTATO CUTTER, INCLUDING AN ENDLESS
CONVEYER FEEDING TO A STATIONARY CUTTER
Filed Feb. 14, 1946 2 Sheets-Sheet 1
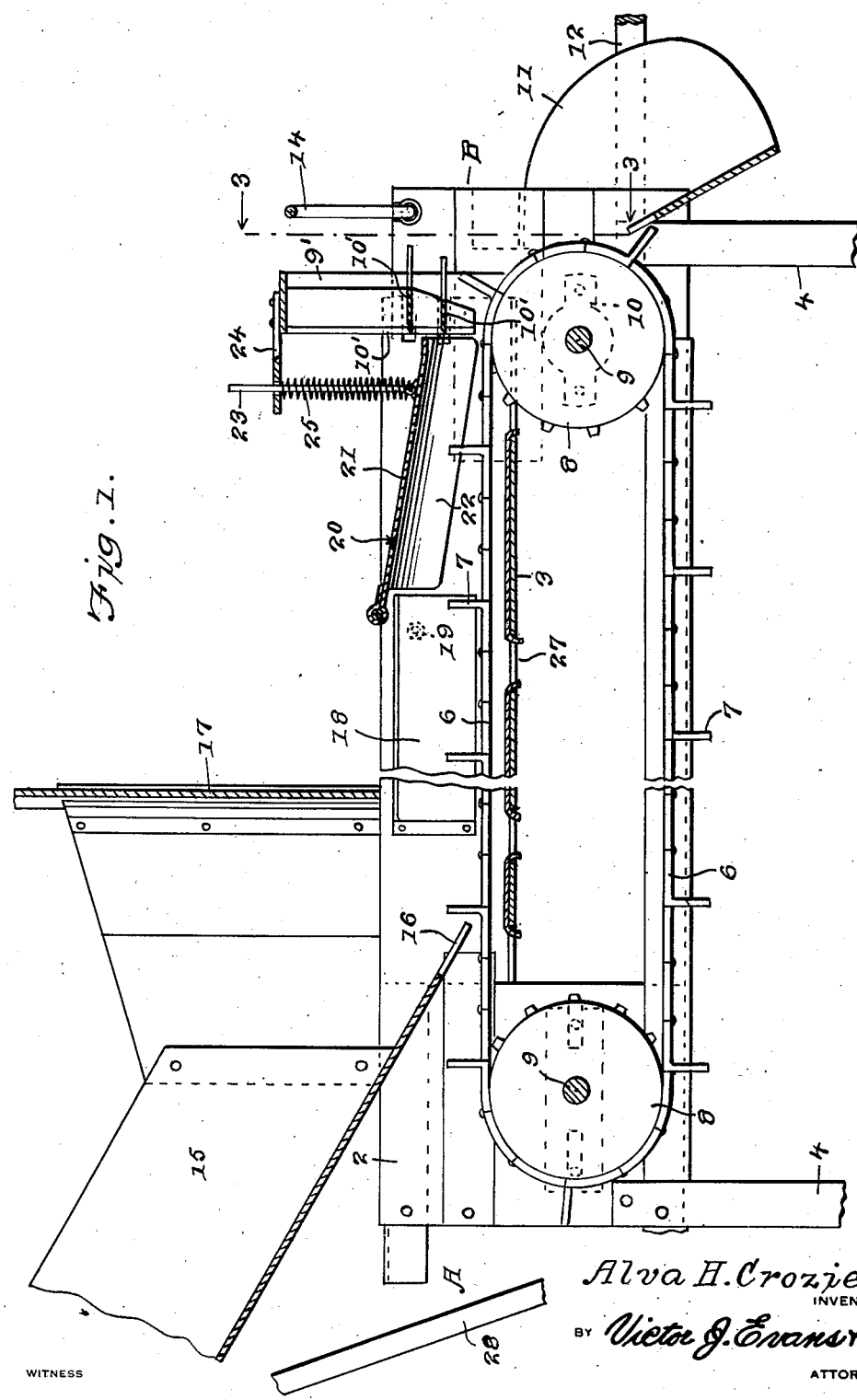
Alva H. Crozier
INVENTOR
BY Victor J. Evans & Co.
ATTORNEY Oct. 5, 1948.  A. H. CROZIER  2,450,583
SEED POTATO CUTTER, INCLUDING AN ENDLESS
CONVEYER FEEDING TO A STATIONARY CUTTER
Filed Feb. 14, 1946  2 Sheets-Sheet 2
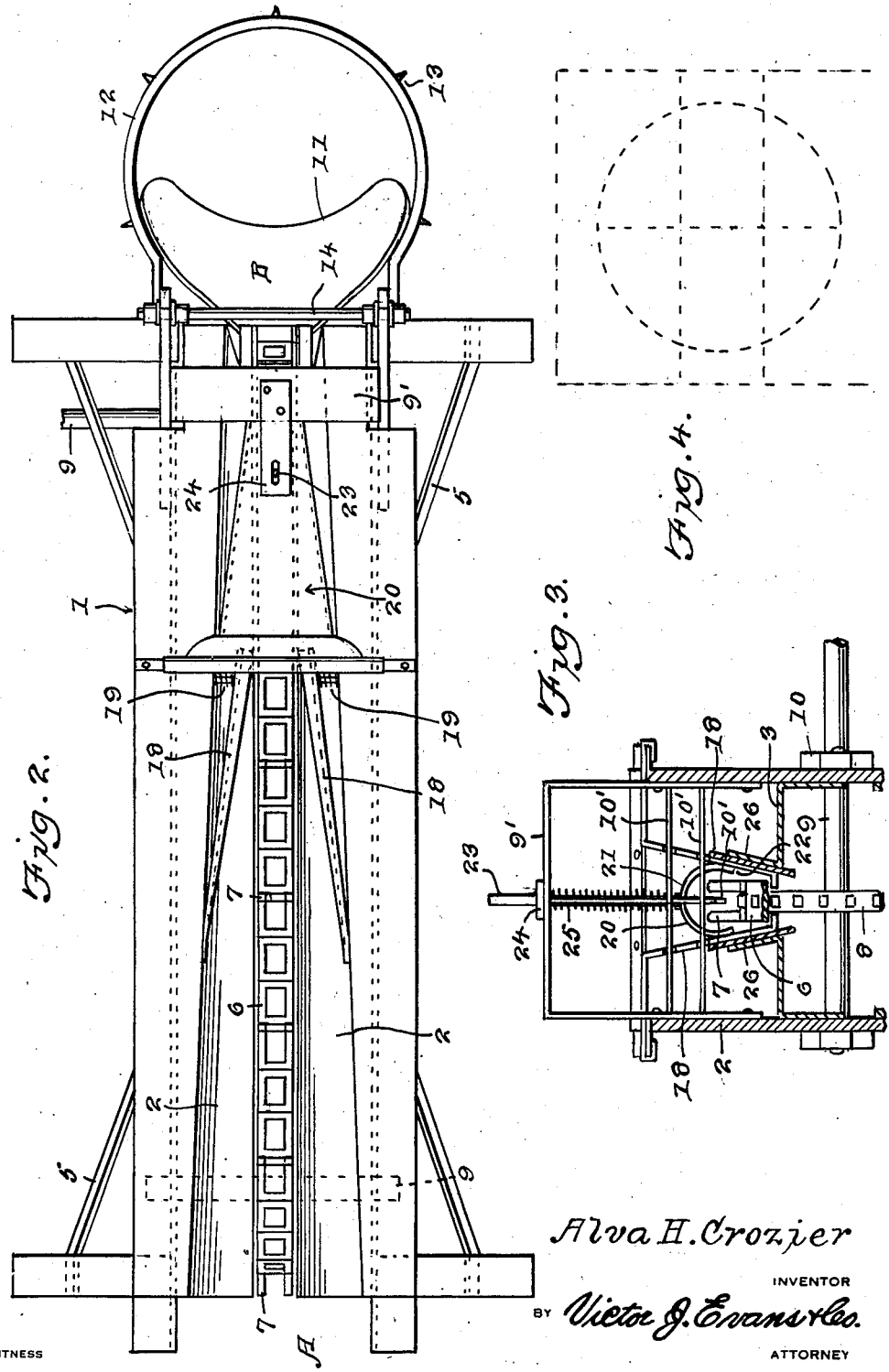
Alva H. Crozier
INVENTOR
BY Victor J. Evans & Co.
ATTORNEY Patented Oct. 5, 1948

2,450,583

UNITED STATES PATENT OFFICE 2,450,583

SEED POTATO CUTTER, INCLUDING AN ENDLESS CONVEYER FEEDING TO A STATIONARY CUTTER

Alva H. Crozier, Cheyenne, Wyo.

Application February 14, 1946, Serial No. 647,452

2 Claims. (Cl. 146—163)

This invention relates to a seed potato cutter and has for the primary object the provision of a device of the above stated character which is in the form of a machine whereby a large number of potatoes may be rapidly and conveniently cut into parts to provide seed plantings and which will be efficient, durable and may be manufactured and sold at a low cost.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a seed potato cutter constructed in accordance with my invention.

Figure 2 is a top plan view showing the device with the hopper removed.

Figure 3 is a transverse sectional view taken on the line 3—3 of Figure 1.

Figure 4 is a diagrammatical view showing how the knives of the cutting mechanism can sever potatoes of different sizes into a plurality of parts.

Referring in detail to the drawings, the numeral 1 indicates a supporting structure including spaced side members 2, a bottom member 3 cooperating therewith and forming a horizontally arranged trough supported by legs 4 and having a receiving end designated generally by the character A and a discharge end by the character B. Braces 5 are provided for strengthening the legs. The bottom wall 3 forms a wear plate for the upper run of a horizontally arranged endless conveyor 6 including a plurality of pusher elements 7. The endless conveyor is trained over sprocket wheels 8 secured on shafts 9. The shafts 9 are journaled in bearings 10 and the latter are mounted on the supporting structure 1 and are capable of adjustment thereon for the purpose of adjusting the conveyor. One of the shafts protrudes beyond one of the sides of the supporting structure and may have a crank handle secured thereto or if desired a pulley may be applied to said shaft so that the device can be belted to a power source. The rotation of the last-named shaft is in a direction to cause the upper run of the conveyor to travel from the receiving end A towards the discharge end B.

A bracket 9' is mounted on the supporting structure 1 adjacent the discharge end B of the trough and supports a cutting mechanism consisting of horizontally and vertically arranged knife blades 10' and which have their cutting edges disposed in the direction of the receiving end of the trough. The knife blades are so grouped as to sever potatoes of different sizes into a plurality of parts as indicated in the diagrammatical view and numbered Figure 4. The potatoes one at a time are brought into engagement with the cutting edges of the knife by the conveyor and are caused to travel past said knife blades and thereby become severed into a plurality of parts suitable for planting. Potatoes as they are severed into the plurality of parts discharge at the end B of the trough and fall into a chute 11 which extends into a sack supported on a sack support 12, the latter being of semicircular shape with its ends suitably secured to the supporting structure 1, and is provided with a plurality of tines or hooks 13 on which the sack may engage for supporting the mouth of the sack in an open position with the chute protruding therein.

A brace 14 connects the side walls of the supporting structure adjacent the discharge end B and is offset so that severed potatoes passing from the knife blades will not be interfered by the brace.

Adjacent the receiving end of the trough and mounted on the supporting structure 1 is a hopper 15, the discharge end of which is disposed directly over the upper run of the conveyor, the bottom wall of said hopper being provided with a slot 16 to permit the flights to pass said bottom wall. The hopper is provided with a control gate 17 for regulating the flow of potatoes from said hopper onto the conveyor.

Flexible guide plates 18 are secured to the side walls of the supporting structure adjacent the hopper and converge towards each other for the purpose of guiding the potatoes from the hopper onto the upper run of the conveyor so that the potatoes will progress along the trough in single file. Springs 19 act on the guide plates to urge them towards each other but which will permit the converging or contracted ends of the plates to spread in case of an extremely large potato passing towards the knives.

A flap 20 is hinged at one end on the supporting structure and adjacent the contracted ends of the guide plates and includes a top wall 21 tapering towards its free end and converging side walls 22. The free ends of the side walls and the free end of the top wall terminate adjacent the cutting edges of the knife blades and the top wall has pivoted thereto a guide rod 23 operating in a guide 24 mounted on the bracket 9'. A coil spring 25 is mounted on the rod 23 between the guide 24 and the top wall of the flap 20 for urging the latter downwardly. The flap acts to keep the potatoes in engagement with the flap as they near the knife blade and also to guide the potatoes properly into engagement with the cutting edges. The wear plate 3 has upstanding flanges 26 which receive therebetween the side walls of the flap 20 for cooperating therewith in properly directing the potatoes to the cutting edges of the knife blades. The wear plate is also provided with openings 27 through which dirt and other foreign matter may fall as it is separated from the potatoes during their movement towards the blades by the conveyor. A brace 28 is provided between the hopper and the supporting structure 1.

What is claimed is:

1. A seed potato cutter comprising the combination of a supporting structure, a horizontally arranged trough on said structure and having a discharge end, an endless conveyor on said structure and having a flight operating in said trough and provided with a plurality of split pusher elements, a hopper for feeding potatoes onto the conveyor for engagement by said split pusher elements, a control gate carried by said hopper, flexible guide plates secured to the supporting structure within the trough, spring means between the guide plates and the supporting structure for yieldably converging the ends of the guide plates toward each other and adjacent the endless conveyor for directing potatoes from the hopper onto the conveyor, a cutting mechanism, means carried by the supporting structure for maintaining said cutting mechanism above and adjacent the endless conveyor and adjacent the discharge end of the trough and within the latter whereby potatoes carried by said conveyor are forced by the split pusher elements through said cutting mechanism for severing the potatoes into a plurality of parts, said cutting mechanism including a plurality of vertically and horizontally arranged and relatively spaced blades having cutting edges facing the potatoes moved by the conveyor, said vertically arranged blade being straddled by said split pusher elements as the same move past said blade, and means above the endless conveyor for guiding the potatoes carried by the conveyor into engagement with the cutting edges of the blades.

2. A seed potato cutter comprising the combination of a supporting structure, a horizontally arranged trough on said structure and having a discharge end, an endless conveyor on said structure and having a flight operating in said trough and provided with a plurality of split pusher elements, a hopper for feeding potatoes onto the conveyor for engagement by said split pusher elements, a control gate carried by said hopper, flexible guide plates secured to the supporting structure within the trough, spring means between the guide plates and the supporting structure for yieldably converging the ends of the guide plates toward each other and adjacent the endless conveyor for directing potatoes from the hopper onto the conveyor, a cutting mechanism, means carried by the supporting structure for maintaining said cutting mechanism above and adjacent the endless conveyor and adjacent the discharge end of the trough and within the latter whereby potatoes carried by said conveyor are forced by the split pusher elements through said cutting mechanism for severing the potatoes into a plurality of parts, said cutting mechanism including a plurality of vertically arranged and horizontally arranged and relatively spaced blades having cutting edges facing the potatoes moved by the conveyor, said vertically arranged blade being straddled by said split pusher elements as the same move past said blade, a flap hinged on the supporting structure and including a top wall tapering towards its free end and side walls converging towards their free ends for guiding potatoes carried by the conveyor into engagement with the cutting edges of the blades, and spring means acting on the flap to urge the latter in the direction of the conveyor.

ALVA H. CROZIER.

REFERENCES CITED

The following references are of record in the file of this patent:

UNITED STATES PATENTS

| Number | Name | Date |
|---|---|---|
| 1,099,205 | Ryan | June 9, 1914 |
| 1,441,844 | Garrett et al. | Jan. 9, 1923 |

FOREIGN PATENTS

| Number | Country | Date |
|---|---|---|
| 160,146 | Germany | Apr. 29, 1905 |
| 187,063 | Switzerland | Jan. 2, 1937 |